Oct. 4, 1960 R. C. MONTROSS 2,955,244
ELECTRIC CIRCUIT
Filed Feb. 19, 1959

INVENTOR.
Robert C. Montross
BY Clyde H. Haynes
his atty.

United States Patent Office 2,955,244
Patented Oct. 4, 1960

2,955,244

ELECTRIC CIRCUIT

Robert C. Montross, Thiensville, Wis., assignor to Square D Company, Detroit, Mich., a corporation of Michigan Filed Feb. 19, 1959, Ser. No. 794,326

1 Claim. (Cl. 318—331)

This invention is directed to a system for controlling the speed of a D.-C. motor, and in particular, to a speed controlling system which compensates for the IR (current times resistance) drop across the armature of a motor energized with current having A.-C. and D.-C. components.

The speed of an electric motor may be regulated by combining a speed-responsive voltage signal, or feedback signal, from the motor armature with a reference voltage signal, which represents the desired speed of the motor. This combining of signals provides an error signal, which represents the difference between the actual speed of the motor and the desired speed of the motor. The error signal is used to control, or to operate, a control means, which varies the energization of the motor, and causes it, either, to speed up, or to slow down, until the error signal has reached a stable value, which is a function of the reference setting, and is proportional to the desired speed of the motor.

When a D.-C. motor is energized, the armature current tends to increase and the motor speed tends to drop as the load is increased, thereby tending to increase the error voltage representing the deviation of the speed of the motor from the desired speed. However, said increase in error voltage does not compensate for the increased IR drop in the motor armature caused by an increase in load.

Prior to the present invention, the IR drop of the armature was often compensated by a voltage feedback signal from a resistor connected in series with the armature. The signal from the resistor was added in series with the speed-responsive signal to compensate for the internal IR drop of the armature to maintain constant motor speed. Naturally, extra electrical components and extra circuitry were needed to combine these two signals, or to algebraically add them together, to obtain a signal which was combined with a reference voltage signal to provide the error signal.

One of the main objects of the present invention is to provide a new and novel system for compensating for the D.-C. motor armature IR drop in an armature voltage responsive speed control system.

A further object of the invention is to make use of the A.-C. and D.-C. components of the current energizing the armature to provide an error signal which compensates for armature IR drop, as well as any error in actual speed of the armature.

Figure 1:
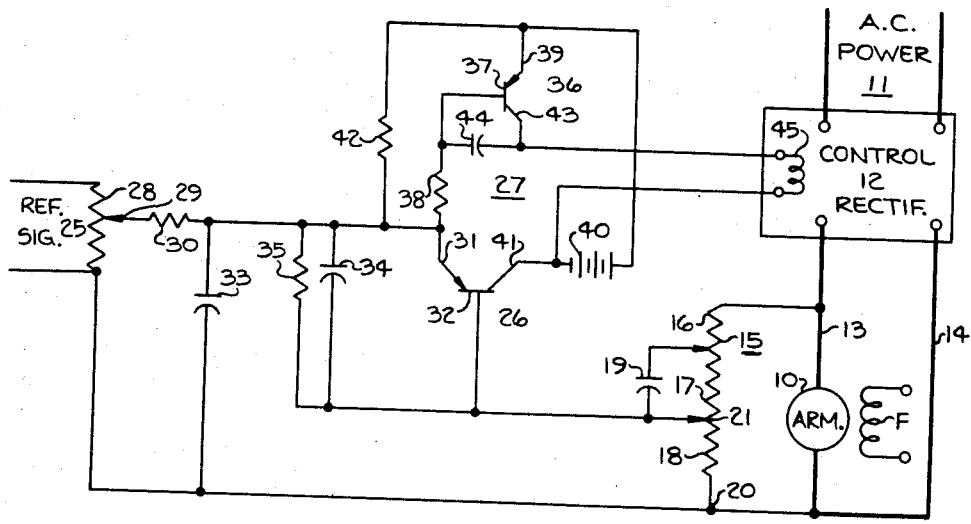
Figure 2:
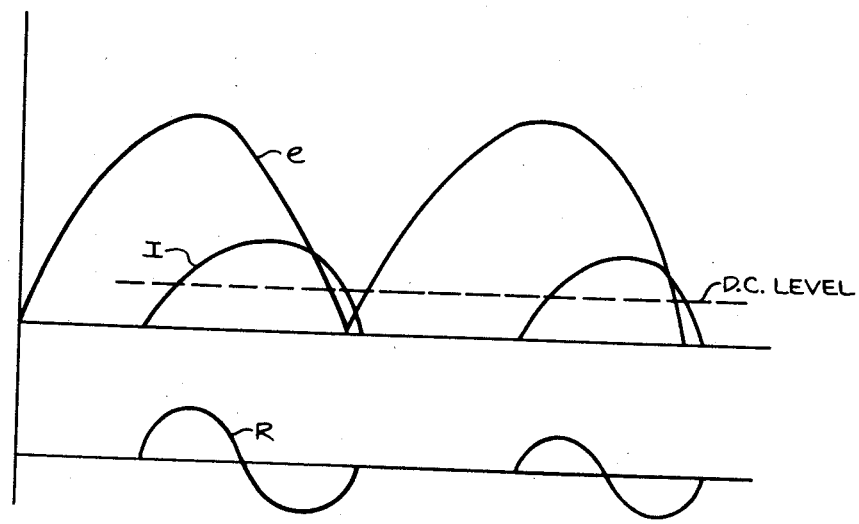

Other objects and a fuller understanding of this invention may be had by referring to the following description and claim, taken in conjunction with the accompanying schematic drawing in which Figure 1 illustrates a speed control system for a motor which incorporates the present invention; and Figure 2 is a chart representing various voltages and currents in the system.

The objects of the invention are met by a transistorized circuit, which combines voltage signals, fed from a D.-C. motor armature, with reference voltage signals to produce an error signal, which is capable of effecting changes in the energization of the motor. In this circuit the voltage signal is obtained by connecting a voltage divider, which is free of inductance and capacitance, across the armature and shunting part of that voltage divider with a capacitor. The circuit operates best when the motor is energized with current containing A.-C. and D.-C. components, such as are inherent in rectified A.-C. power supplies for motors.

The voltage divider and the capacitor provide an A.-C. voltage signal to compensate for IR drop in the armature and a D.-C. signal to represent actual speed. Both of these voltages, along with a desired-speed or reference signal voltage, are impressed across the emitter to base of a transistor, thereby utilizing both the rectifying properties and the amplification properties of the transistor. The resultant error signal developed across the transistor base and emitter is amplified and used to control the flow of current to power or energize the armature. As illustrated, the error signal may, after amplification, be used to control the flow of current between the source of A.-C. power and the D.-C. motor armature.

Figure 1 illustrates an example of a system for controlling the speed of a D.-C. motor and which compensates for the IR drop across the armature of the motor. As illustrated, the motor armature 10 is energized from an A.-C. power supply 11 and the energization or flow of current through the armature is controlled and rectified by a control and rectifier means 12. The armature 10 is connected to the control and rectifier 12 by suitable wires 13 and 14. In this example, the field for the motor is designated by the part F and may be a shunt field energized from any suitable source of direct current.

Speed-responsive feedback signals in the form of voltage signals are obtained by shunting the armature 10 with a voltage divider 15 comprising series-connected resistors 16, 17, and 18. The extreme end of the resistor 16 is connected to the lead 13 and the extreme end of the resistor 18 is connected to the lead 14 at a point 20. Shunting the intermediate resistor 17, which interconnects the inner ends of the resistors 16 and 18, is a capacitor 19. As illustrated, voltage divider 15 may be a single resistor and the connections of the capacitor to the resistor 15 may be adjustable therealong so that the resistance of the resistors 16, 17, and 18 may be adjusted. The feedback voltage signal appears between the point 20 and a point 21 located between the resistor 18 and the resistor 17.

This feedback voltage signal, which has an A.-C. component and a D.-C. component, is algebraically added to a D.-C. reference voltage signal obtained from a reference signal source 25 to obtain an error signal which is applied to a transistor 26. The error signal, which has A.-C. and D.-C. components, is applied to the transistor 26 and is rectified by transistor 26, and the rectified voltage signal is then amplified by that transistor 26 and an amplifier circuit 27 and ultimately is used to control the control and rectifier means 12.

Structurally, the reference signal source 25 is connected directly across a speed potentiometer 28, one end of which is also connected directly to the point 20. A pick-off 29, which slides along the potentiometer 28, is connected through a resistor 30 to an emitter 31 of the transistor 26. As illustrated, the base 32 of the transistor 26 is connected directly to the point 21. A timing circuit capacitor 33 is interconnected between the emitter 31 and the point 20 to limit any inrush of current from reference signal 25. Interconnected between the emitter 31 and the base 32 is a filter capacitor 34 and a resistor 35, the capacitor and resistor being in parallel with each other.

In the amplifying section 27, a transistor 36 has its base 37 connected through a resistor 38 to the emitter 31 and has its emitter 39 connected through a battery 40, or other source of direct current, to a collector 41 of the transistor 26. A resistor 42 is also interconnected between the emitters 31 and 39 of the transistors 26 and 36, respectively. Interconnected between the base 37 and the collector 43 of the transistor 36 is a suppressor capacitor 44. The signal voltage for controlling the control and rectifier means 12 appears between the collectors 41 and 43 of the transistors 26 and 36. Thus the collectors 41 and 43 are connected to their respective terminals on the control means 12. In this instance these collectors are illustrated as being connected to the control winding 45 of the control means 12, such as a suitable magnetic amplifier or saturable reactor. The balance of the control means 12 is not illustrated in the drawing since the use of magnetic amplifiers and saturable reactors in combination with rectifiers to control the amount of current used to energize the armature of a D.-C. motor from an A.-C. power is well known in the art.

The operability of this circuit is based on the premise that any D.-C. motor, which has its armature 10 supplied from a rectified A.-C. supply 11, will have an armature current (curve I in Fig. 2) which contains an alternating current component (curve R in Fig. 2) or A.-C. ripple. The A.-C. component is a result of discontinuous conduction of the rectifier 12 into the inductance of the armature 10. As the motor load is increased, the amount of armature current required also increases, and along with the average value of current increase, the ripple component increases in proportion. In the present example, a reference or speed voltage is combined with a speed feedback voltage to produce an error signal which causes the control and rectifying means 12 to conduct into the motor armature 10, causing the motor to turn and develop a counter voltage. This counter voltage is proportioned or divided by voltage divider 15, so that the D.-C. voltage at point 21 is approximately equal to the maximum speed voltage point 29 when the motor is running at rated speed. Since the polarity of the counter voltage at point 21 is the same as the speed voltage, the transistor 26 sees the difference between these two voltages as an error signal, with this difference, or algebraic sum, appearing across the emitter and base. An increase in counter voltage decreases the error signal, and the decreased error signal tends to decrease conduction of the rectifying means. A stable condition is reached for the speed of the motor, this speed being in direct proportion to the setting of point 29 along resistor 28. When the motor is loaded at a given speed setting, the motor speeds tends to drop, thereby producing an increase in the error or signal voltage appearing across the emitter 31 to base 32 of transistor 26. The signal change to the error amplifier compensates for the internal IR drop of the armature, and the motor speed will remain constant.

By use of a low A.-C. impedance network, including resistor 16 and capacitor 19, the amount of A.-C. ripple voltage present at the junction or point 21 is increased over the normal D.-C. voltage determined solely by the resistance of voltage divider 15. Capacitor 19 is a relatively low impedance as compared to the resistance of resistors 16, 17, and 18, and the ripple component is easily transmitted to point 21 while any additional D.-C. component is blocked. This ripple component, which compensates for IR drop in armature 10, is converted to a D.-C. signal connected in the correct polarity to add to the speed voltage from point 29, or to subtract from the D.-C. component from voltage divider 15. Thus a compensating voltage is obtained which will increase the signal to the amplifier just enough to phase the rectifying means ahead the small amount required to maintain speed constant with load change. Because the input to a common emitter connected transistor amplifier is made up of a diode junction (emitter to base), the required diode is available for rectifying purposes and, also, the transistor has the property of amplifying a signal for transmission to other amplifiers or stages.

As a pulse of current is drawn through the motor armature 10, this pulse is transmitted through resistors 16 and 17 and capacitor 19 to point 21. At point 21 the A.-C. pulse has two parallel paths to flow in order to return to the armature. These are: (1) resistor 18; (2) resistor 35-capacitance 34, and a parallel combination comprising resistor 30 and part of resistor 28 in parallel with capacitor 33. The combined impedance of resistors 30 and 28 is selected to be large compared with the impedance of capacitor 33. Therefore the flow of ripple current may be considered to be primarily through capacitor 33. If the pulse polarity is such that the current is flowing from point 21 to ground, or point 20, the transistor emitter 31 to base 32 diode exhibits high impedance and the ripple current is by-passed through the capacitor 34 and resistor 35 combination through capacitor 33 to point 20. A portion of this ripple signal also flows directly through resistor 18 to point 20. For the second half cycle of the pulse, when the current flow is from point 20 to point 21, the ripple flow is from point 20 through capacitor 33 and emitter 31 to base 32 of transistor 26, since the emitter to base resistance is small as compared to the impedance of capacitor 34-resistor 35 for this polarity. This rectified ripple voltage increases the average current signal through transistor 26 input to give the desired increase in output of transistor 26.

This rectified component is superimposed on the speed voltage from resistor 28 and is the same magnitude for a given motor load, regardless of the setting of point 29 on resistor 28, which setting determines the motor operating speed.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

In a controller for a D.C. motor having an armature energizable from a rectified A.C. voltage source, the combination comprising; a reference voltage signal source providing a reference voltage signal, controlling means including a transistor having a base and emitter coupled to the reference voltage source for controlling the energization of the armature, a feedback circuit means connected to the armature for providing a negative feedback voltage signal proportional to the voltage supplied to the armature, said feedback circuit means having a connection to the base of the transistor and a connection through the reference source to the emitter of the transistor so the conduction of the transistor is proportional to the algebraic sum of the reference and feedback voltage signals, and a compensating circuit means connected to the feedback circuit means and to the armature and arranged to impress the A.C. ripple in the rectified A.C. voltage through the reference source across the base and emitter of the transistor when the transistor is conducting, which A.C. ripple is proportional to current flow in the armature for varying the conduction of the transistor directly with current flow through the armature for maintaining the speed of the motor constant independently of variations in the load on the motor.

References Cited in the file of this patent

UNITED STATES PATENTS 2,899,620    Anger et al. _____ Aug. 11, 1959